United States Patent [19]
Hwang et al.

[11] Patent Number: 5,903,138
[45] Date of Patent: May 11, 1999

[54] TWO-STAGE SWITCHING REGULATOR HAVING LOW POWER MODES RESPONSIVE TO LOAD POWER CONSUMPTION

[75] Inventors: Jeffrey H. Hwang, Saratoga; Alland Chee, Union City, both of Calif.

[73] Assignee: Micro Linear Corporation, San Jose, Calif.

[21] Appl. No.: 08/916,570

[22] Filed: Aug. 22, 1997

Related U.S. Application Data

[63] Continuation-in-part of application No. 08/413,249, Mar. 30, 1995.

[51] Int. Cl.$^6$ ..................................................... G05F 1/563
[52] U.S. Cl. ........................... 323/266; 323/224; 323/284; 363/89
[58] Field of Search .................................. 323/222, 224, 323/266, 271, 282, 284; 363/65, 890, 97, 131

[56] References Cited

U.S. PATENT DOCUMENTS

| | | | |
|---|---|---|---|
| 3,294,981 | 12/1966 | Bose | 307/88.5 |
| 3,603,809 | 9/1971 | Uchiyama | 307/228 |
| 3,660,753 | 5/1972 | Judd et al. | 323/22 T |
| 3,742,330 | 6/1973 | Hodges et al. | 323/266 |
| 3,883,756 | 5/1975 | Dragon | 307/265 |
| 4,035,710 | 7/1977 | Joyce | 363/89 |
| 4,293,904 | 10/1981 | Brooks et al. | 323/282 |
| 4,311,954 | 1/1982 | Capel | 323/222 |
| 4,392,103 | 7/1983 | O'Sullivan et al. | 323/222 |
| 4,407,588 | 10/1983 | Arichi et al. | 368/118 |
| 4,437,146 | 3/1984 | Carpenter | 363/21 |
| 4,456,872 | 6/1984 | Froeschle | 323/286 |
| 4,529,927 | 7/1985 | O'Sullivan et al. | 323/222 |
| 4,651,231 | 3/1987 | Douglas, Jr. | 358/342 |
| 4,661,896 | 4/1987 | Kobayashi et al. | 323/266 |
| 4,672,303 | 6/1987 | Newton | 323/285 |

(List continued on next page.)

FOREIGN PATENT DOCUMENTS 60-22490  2/1985  Japan .................................. H02P 5/41

OTHER PUBLICATIONS

"Nonlinear–Carrier Control for High Power Factor Rectifiers Based On Flyback, Cuk, or Sepic Converters," R. Zane and D. Maksimovic, Applied Power Electronics Conf., pp. 814–820, Mar. 1996.

"Nonlinear–Carrier Control for High Power Factor Boost Rectifiers," D. Maksimovic, Y. Jang, and R. Erikson, Applied Power Electronics Conf., pp. 635–641, Mar. 1995.

"ML4863 High Efficiency Flyback Controller", Micro Linear Corporation, pp. 1–8, Feb. 1995 (Preliminary).

(List continued on next page.)

*Primary Examiner*—Jeffrey Sterrett
*Attorney, Agent, or Firm*—Haverstock & Owens LLP

[57] ABSTRACT

A two-stage switching regulator having low power modes responsive to load power consumption. A first stage of the regulator is a power factor correction (PFC) stage. A second stage is a pulse-width modulating (PWM) stage. When a load draws a high level of current, switching in both stages is enabled. Under certain conditions, switching in either one or both of the stages is disabled by the duty cycle for the corresponding switch falling to zero. When switching in both stages is enabled, as in a normal mode, switching in the PWM stage is then disabled in response to an error signal falling below a first error threshold. When switching in the PFC stage is enabled and switching in the PWM stage is disabled, as in a first low power mode, switching in the PFC stage is then disabled in response to a feedback voltage rising above a first feedback threshold. When switching in both stages is disabled, as in a second low power mode, switching in the PWM stage is then enabled in response to the error voltage rising above a second error threshold, higher than the first error threshold. When switching in the PFC stage is disabled and switching in the PWM stage is enabled, as in a third low power mode, switching in the PFC stage is enabled in response to the feedback voltage falling below the second feedback threshold. As a result of these low power modes, the switching regulator is highly efficient.

25 Claims, 8 Drawing Sheets

U.S. PATENT DOCUMENTS

| | | | |
|---|---|---|---|
| 4,672,518 | 6/1987 | Murdock | 363/21 |
| 4,674,020 | 6/1987 | Hill | 363/21 |
| 4,677,366 | 6/1987 | Wilkinson et al. | 323/222 |
| 4,691,159 | 9/1987 | Ahrens et al. | 323/222 |
| 4,731,574 | 3/1988 | Melbert | 323/275 |
| 4,736,151 | 4/1988 | Dishner | 323/224 |
| 4,761,725 | 8/1988 | Henze | 363/46 |
| 4,837,495 | 6/1989 | Zansky | 323/222 |
| 4,841,220 | 6/1989 | Tabisz et al. | 323/282 |
| 4,845,420 | 7/1989 | Oshizawa et al. | 323/222 |
| 4,920,309 | 4/1990 | Szepesi | 323/269 |
| 4,929,882 | 5/1990 | Szepesi | 323/222 |
| 4,940,929 | 7/1990 | Williams | 323/222 |
| 4,941,080 | 7/1990 | Sieborger | 363/127 |
| 4,947,309 | 8/1990 | Jonsson | 363/17 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,070,439 | 12/1991 | Remson | 323/266 |
| 5,132,606 | 7/1992 | Herbert | 363/89 |
| 5,138,249 | 8/1992 | Capel | 323/283 |
| 5,146,399 | 9/1992 | Gucyski | 363/89 |
| 5,272,613 | 12/1993 | Buthker | 363/89 |
| 5,278,490 | 1/1994 | Smedley | 323/284 |
| 5,359,281 | 10/1994 | Barrow et al. | 323/284 |
| 5,412,308 | 5/1995 | Brown | 323/267 |
| 5,414,341 | 5/1995 | Brown | 323/268 |
| 5,434,767 | 7/1995 | Batarseh et al. | 363/16 |
| 5,436,550 | 7/1995 | Arakawa | 323/222 |
| 5,440,473 | 8/1995 | Ishii et al. | 363/21 |
| 5,450,000 | 9/1995 | Olsen | 323/222 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,477,132 | 12/1995 | Canter et al. | 323/282 |
| 5,479,089 | 12/1995 | Lee | 323/283 |
| 5,481,178 | 1/1996 | Wilcox et al. | 323/287 |
| 5,485,361 | 1/1996 | Sokal | 363/21 |
| 5,491,445 | 2/1996 | Moller et al. | 327/540 |
| 5,502,370 | 3/1996 | Hall et al. | 323/284 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,592,071 | 1/1997 | Brown | 323/282 |
| 5,592,128 | 1/1997 | Hwang | 331/61 |
| 5,610,502 | 3/1997 | Tallant, II et al. | 323/222 |
| 5,617,306 | 4/1997 | Lai et al. | 363/17 |
| 5,627,460 | 5/1997 | Bazinet et al. | 323/288 |
| 5,747,977 | 5/1998 | Hwang | 323/284 |

OTHER PUBLICATIONS

"ML4863EVAL User's Guide High Efficiency Flyback Controller", Micro Linear Corporation, pp. 1–5, Feb. 1995.

"Off–Line And One–Cell IC Converters Up Efficiency," Frank Goodenough, Electronic Design, pp. 55–56, 58, 60, 62–64, Jun. 27, 1994.

"Designing with hysteretic current–mode control," Gedaly Levin and Kieran O'Malley, Cherry Semiconductor Corp., EDN, pp. 95–96, 98, 100–102, Apr. 28, 1994.

"Analysis of the Flyback Converter Operating in Current–Mode Pulse–Frequency Modulation," Urs Mader and K. Kit Sum, High Frequency Power Conversion, Apr. 17, 1994.

"Step–Up/Step Down Converters Power Small Portable Systems," Bruce D. Moore, EDN, pp. 79–82, 84, Feb. 3, 1994.

"ML4861 Low Voltage Boost Regulator," Micro Linear Corporation, Jun. 1993.

"11. Variable Frequency Converters," K. Kit Sum, pp. 96–97, 134–135, Dec. 1993.

"3.3V/5V/Adjustable Output, Step–Up, DC–DC Converters," Maxim Integrated Products, pp. 1–8, Jun. 1993.

"ML4821 Power Factor Controller," Micro Linear Corporation, pp. 6–119 to 6–126, Jun. 1992 (Preliminary).

"ML4821EVAL Average Current PFC Controller Evaluation Kit," Micro Linear Corporation, pp. 6–127, Jul. 1992.

"ML4821 Power Factor Controller," Micro Linear Corporation, pp. 1–12, May 1997.

"Application Note 16—Theory and Application of the ML4821 Average Current Mode PFC Controller," Micro Linear Corporation, pp. 10–102 to 10–119, Jan. 1992.

"Small–Signal High–Frequency Analysis Of The Free–Running Current–Mode–Controlled Converter," Richard Redl, pp. 897–906, IEEE Apr. 1991.

"Low–Voltage–Input, 3V/3.3V/5V/Adjustable–Output, Step–Up DC–DC Converters," Maxim Integrated Products, pp. 4–189 to 4–191 Jul. 1997.

"LT1073 Micropower DC–DC Converter Adjustable and Fixed 5V, 12V" Linear Technology, pp. 4–174 to 4–189, 4–192, Jul. 1997.

"Application Note 30," Linear Technology, p. AN30–42, Jul. 1997.

"System–Engineered Portable Power Supplies Marry Improved Efficiency And Lower Cost," Bruce D. Moore, Maxim Integrated Products Jul. 1997.

"ML4823 High Frequency Power Supply Controller" Micro Linear Corporation, pp. 1–8, Dec. 1994 (Preliminary).

"CD54/74HC 4046A, CD54/74HCT 4046A Technical Data," File No. 1854, RCA, Jul. 1997.

"ML4863 High Efficiency Battery Pack Converter," Micro Linear Corporation, P.1, Jun. 1994 (Preliminary).

"ML4880 Portable PC/PCMCIA Power Controller," Micro Linear Corporation, P.1, Oct. 1995 (Preliminary).

TWO-STAGE SWITCHING REGULATOR HAVING LOW POWER MODES RESPONSIVE TO LOAD POWER CONSUMPTION

This is a continuation-in-part of application Ser. No. 08/413,249, filed Mar. 30, 1995, the contents of which are hereby incorporated by reference.

FIELD OF THE INVENTION

The invention relates to the field of switching mode power converters. More particularly, the invention relates to the field of minimizing power consumption in a switching mode power converter during periods of low power consumption by a load.

BACKGROUND OF THE INVENTION

Figure 1:
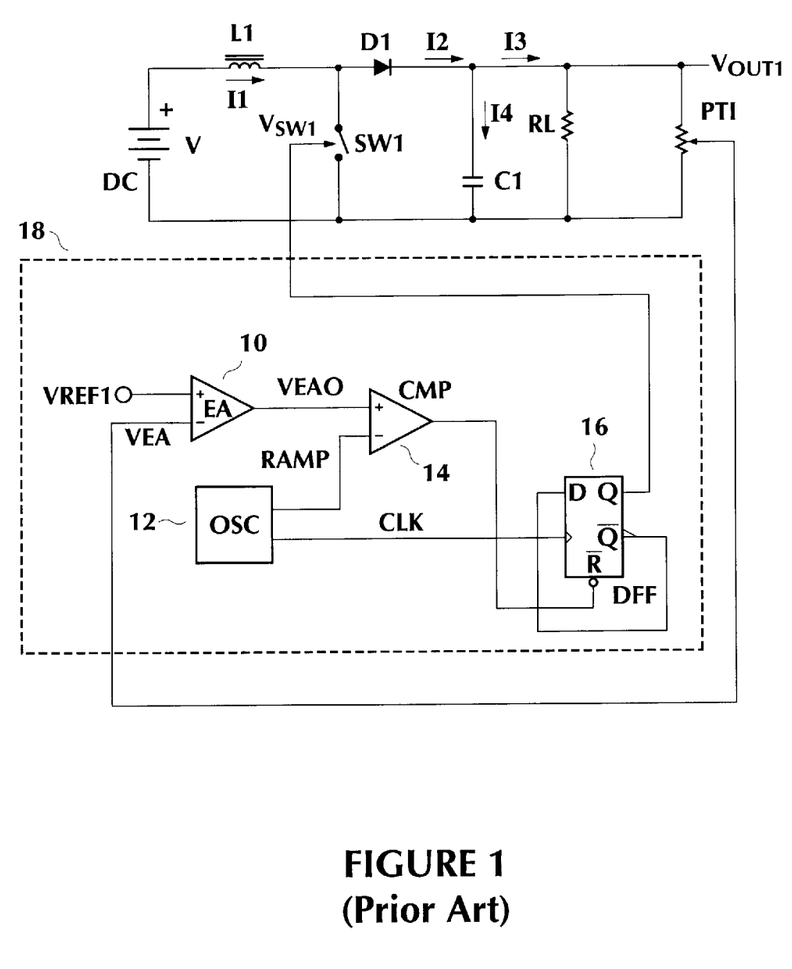
FIG. 1 illustrates a prior art switching mode power converter which uses a trailing edge modulation control scheme.

For typical switching mode power converters of the prior art, the output voltage is controlled by an electronic circuit which measures a level of the output voltage, compares that measured level to a predetermined desired level, and develops a response to that measurement elsewhere in the circuit in order to more accurately achieve the desired output voltage. A prior art switching mode power converter which uses a trailing edge modulation control scheme is illustrated in FIG. 1. The input voltage Vin is coupled to a first terminal of the inductor L1. A second terminal of the inductor L1 is coupled to a first terminal of a switch SW1 and to an anode of a diode D1. A capacitor C1 is coupled between a cathode of the diode D1 and a second terminal of the switch SW1. A load RL is coupled across the capacitor C1. A potentiometer PT1 is coupled across the load RL and provides a negative input of a voltage error amplifier 10. A reference voltage Vref1 is coupled to the positive input of the error amplifier 10. The output VEAO of the voltage error amplifier 10 is coupled as the positive input of a modulating comparator 14. The negative input of the modulating comparator 14 is coupled to receive the ramp output of an oscillator 12. The output of the modulating comparator 14 is coupled as the reset input R of a flip-flop 16. The input D of the flip-flop 16 is coupled to the inverted output $\overline{Q}$ of the flip-flop 16. A clock input CLK of the flip-flop 16 is coupled to the clock output of the oscillator 12. The output Q of the flip-flop 16 is coupled to control the operation of the switch SW1.

The output voltage Vout1 supplied to the load RL is formed by integrating the inductor current I1 in the capacitor C1. Pulse width modulation (PWM) is used to maintain a constant output voltage Vout1 when the input voltage Vin or current drawn by the load RL varies over time. By modulating the width of voltage pulses that control the switch SW1, the output voltage Vout1 can be maintained at a constant level. Energy from the input source Vin is stored in the inductor L1 when the switch SW1 is closed. When the switch SW1 is open, energy from the inductor L1 is transferred to the capacitor C1 and to the load RL. A predetermined fraction of the output voltage Vout1 is formed by the potentiometer PT1. This voltage VEA is input into the negative terminal of the error amplifier 10 for comparison to the reference voltage Vref1. The comparison determines how close the actual output voltage Vout1 is to the desired output voltage and is used to modulate the width of the pulses that control the switch SW1.

FIG. 1 illustrates a trailing edge pulse width modulation scheme for controlling the switch SW1. In trailing edge modulation, the switch SW1 turns on (closes) on the trailing edge of the clock signal. The leading edge of the clock signal may also be utilized to implement leading edge modulation. For a leading edge modulation control scheme, the inputs to the error amplifier 10 are reversed: the voltage VEA from the potentiometer PT1 is coupled to the positive terminal of the voltage error amplifier 10 and the reference voltage Vref1 is coupled to the negative terminal of the voltage error amplifier 10. Also, the control voltage VSW1 is taken directly from the output $\overline{Q}$ of the flip-flop 16.

Figure 2:
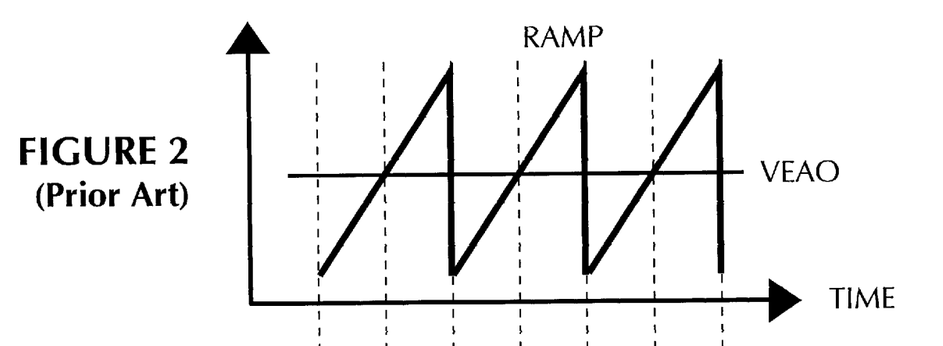
FIG. 2 illustrates voltage level with respect to time for the error amplifier output VEAO and the modulating ramp output of the oscillator 12 illustrated in FIG. 1.
Figure 3:
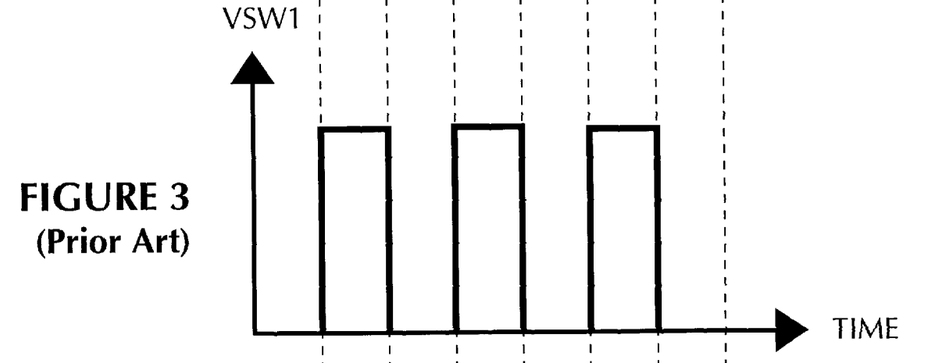
FIG. 3 illustrates the voltage level with respect to time of the control voltage VSW1 for the switch SW1 illustrated in FIG. 1.
Figure 4:
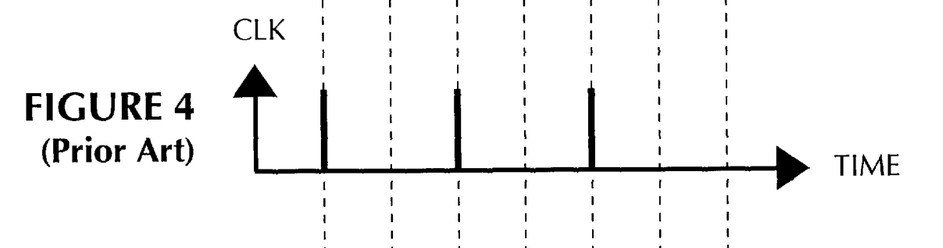
FIG. 4 illustrates the clock output of the oscillator 12 illustrated in FIG. 1 with respect to time.

FIGS. 2, 3 and 4 show corresponding voltage waveforms with respect to time of different voltage levels at different points within the switch control circuit 18 of the trailing edge scheme, illustrated in FIG. 1. The time axis for the FIGS. 2, 3 and 4 has been drawn to correspond in all three figures. FIG. 2 illustrates the voltage levels with respect to time of the error amplifier output VEAO and the modulating ramp output of the oscillator 12. FIG. 3 illustrates the voltage level of the control voltage VSW1 for the switch SW1 with respect to time. The switch SW is "on" or closed when the control voltage VSW1 is at a high voltage level. The switch SW1 is "off" or open when the control voltage VSW1 is at a low voltage level. FIG. 4 illustrates the clock impulses with respect to time of the clock output of the oscillator 12.

The switch SW1 will turn on after the trailing edge of the system clock. Once the switch SW1 is on, the modulating comparator 14 then compares the error amplifier output voltage VEAO and the modulating ramp. When the modulating ramp reaches the error amplifier output voltage, the output of the modulating comparator 14 will fall to a logical low voltage level. Because of the inverter coupled to the input, the input R of the flip-flop 16 will then rise to a logical high voltage level thereby resetting the output Q of the flip-flop 16 to a logical low voltage level and turning the switch SW1 off. When the switch SW1 is on, the inductor current IL will ramp up. The effective duty cycle of the trailing edge modulation is determined as a ratio of the on time of the switch SW1 to its off time. FIG. 1 illustrates a typical trailing edge control scheme using a single boost power converter stage. As the input voltage Vin or current drawn by the load RL vary over time, the duty cycle or time that the switch SW1 is on will vary in order to maintain a constant output voltage Vout1.

While the above-described circuit regulates the output voltage Vout1, it does not ensure that the input current follows the input voltage in time and amplitude proportionally. When a power converter such as in shown in FIG. 1 is coupled to receive a rectified line voltage, it can cause problems in a power distribution system, such as reducing the capacity of the distribution system, increasing harmonics and overheating substation transformers. Therefore, it is desirable that a power converter ensure that the input current follow the line voltage such that the power converter is substantially a resistive load to the power line. A power factor correction circuit ensures that the input current follows the line voltage in time and amplitude proportionally (i.e. the input voltage and current are maintained in phase relative to each other).

Figure 5:
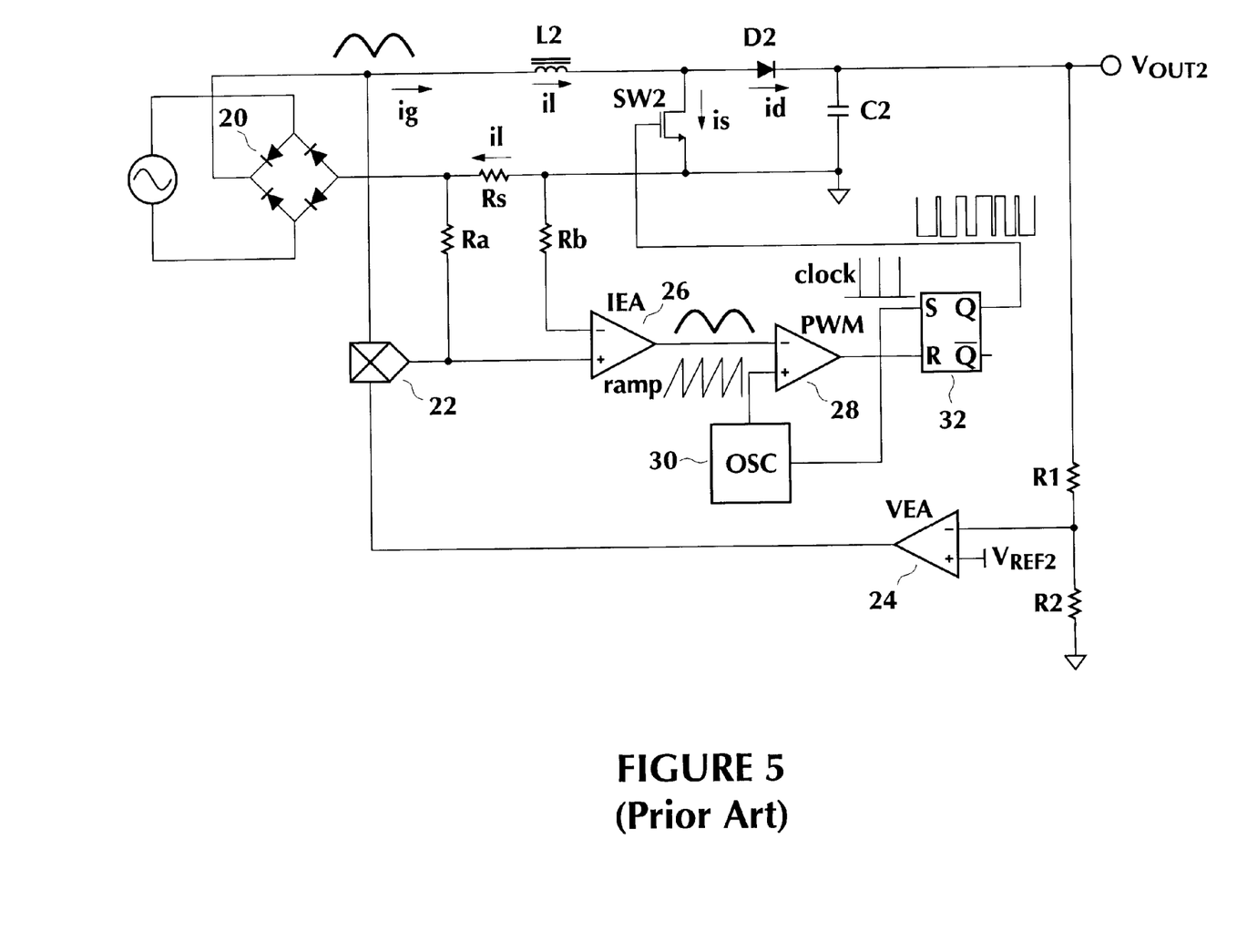
FIG. 5 illustrates a circuit diagram of a prior art boost rectifier circuit including pulse-width modulation and power factor correction (PFC).

A circuit diagram of a prior art boost rectifier circuit including pulse width modulation and power factor correction (PFC) is illustrated in FIG. 5. A line voltage is coupled to the input terminals of a full wave bridge rectifier 20. A first output terminal of the full wave bridge rectifier 20 is coupled to a first terminal of an inductor L2 and to a first input terminal of a multiplier 22. A second terminal of the inductor L2 is coupled to a drain of an NMOS transistor SW2 and to an anode of a diode D2. A source of the NMOS transistor SW2 is coupled to the ground node.

A cathode of the diode D2 is coupled to a first terminal of a capacitor C2 and to an output node Vout2. A second terminal of the capacitor C2 is coupled to the ground node. A first terminal of a resistor R1 is coupled to the output node Vout2. A second terminal of the resistor R1 is coupled to a negative input of an output voltage error amplifier 24 and to a first terminal of a resistor R2. A second terminal of the resistor R2 is to the ground node. A positive input of the voltage error amplifier 24 is coupled to a reference voltage Vref2. An output of the voltage error amplifier 24 is coupled to a second input of the multiplier 22.

An output of the multiplier 22 is coupled to a positive input terminal of a current error amplifier 26 and to a first terminal of a resistor Ra. A second terminal of the resistor Ra is coupled to a second output terminal of the full wave bridge rectifier 20 and to a first terminal of a sense resistor Rs. A second terminal of the sense resistor Rs is coupled to a first terminal of a resistor Rb and to the ground node. A second terminal of the resistor Rb is coupled to a negative input terminal of the current error amplifier 26. An output of the current error amplifier 26 is coupled to a negative input terminal of a modulating comparator 28. A ramp output of an oscillator 30 is coupled to a positive input terminal of the modulating comparator 28. An output of the modulating comparator 28 is coupled as an input R of a flip-flop 32. A clock output of the oscillator 30 is coupled as an input S of the flip-flop 32. An output Q of the flip-flop 32 is coupled to a gate of the NMOS transistor SW2.

A signal from the full wave bridge rectifier 20 is applied to one of the inputs of the multiplier 22. The other input of the multiplier 22 is the output of the voltage error amplifier 24. The multiplier 22 is usually of a current input type which enables the multiplier 22 to have greater ground noise immunity.

The output of the multiplier 22 is a current which is the product of the reference current, the output of the voltage error amplifier 24 and a gain adjustment factor. This output current is applied to the resistor Ra. The voltage across the resistor Ra subtracts from the sensed voltage across the sense resistor Rs and is applied to the current error amplifier 26. Under closed loop control, the current error amplifier 26 will try to keep this voltage differential near the zero volt level. This forces the voltage produced by the return current flowing through the sense resistor Rs to be equal to the voltage across the resistor Ra.

The amplified current error signal output from the current error amplifier 26 is then applied to the negative input of the modulating comparator 28. The other input of the modulating comparator 28 is coupled to receive the ramp signal output from the oscillator 30. Pulse width modulation is obtained when the amplified error signal that sets up the trip point modulates up and down.

Thus, a current control loop modulates the duty cycle of the switch SW2 in order to force the input current to follow the waveform of the full wave rectified sinewave input voltage. The current control loop and the power delivery circuitry must have at least enough bandwidth to follow this waveform.

The above-described power factor correction circuit is a switching mode power converter. Like other switching mode converters, it too, may cause problems in a power distribution system such as large harmonic currents, excessive neutral current, hot spots in a transformer and voltage distortion. Thus, it is desirable to include a second power converter stage to reduce harmonic currents. For example, the output voltage formed by the power factor correction circuit illustrated in FIG. 5 can be utilized as the input voltage Vin of the pulse-width modulation stage illustrated in FIG. 1, thus, forming a combination PFC-PWM power converter.

A drawback to such a combination PFC-PWM power converter is that the switch SW1 in the pulse-width modulation stage and the switch SW2 in the power factor converter stage are both continuously switching at appropriate duty-cycles. Therefore, the PFC-PWM power converter is continuously drawing power. A load coupled to the receive the output voltage Vout1 from the pulse-width modulation stage, however, can require a relatively low current at various times, depending upon the requirements of the load. Therefore, what is needed is a switching regulator that is responsive to the power consumption requirements of the load in order to conserve energy.

SUMMARY OF THE INVENTION

The invention is a two-stage switching regulator having low power modes responsive to load power consumption. A first stage of the two-stage switching regulator is a power factor correction (PFC) stage. The PFC stage receives a rectified AC line voltage and forms a regulated intermediate voltage. The PFC stage includes a first switch which is controlled by a PFC controller. The PFC controller monitors a feedback voltage that is representative of the intermediate voltage. In response to the feedback voltage, the PFC controller adjusts a duty cycle of the first switch for regulating the intermediate voltage. In addition, the PFC controller controls the first switch so that the input current follows the rectified AC line voltage in time and amplitude proportionally.

A second stage is a pulse-width modulating (PWM) stage. The PWM stage receives the intermediate voltage and forms a regulated output voltage. The regulated output voltage is for providing power to a load. The PWM stage includes a second switch which is controlled by a PWM controller. The PWM controller monitors an error signal that is representative of a difference between the output voltage and a desired output voltage. In response to the error signal, the PWM controller adjusts a duty cycle of the first switch for regulating the output voltage.

Under conditions when the load draws a relatively high level of current from the PWM stage, the PFC and PWM stages operate in a normal mode as described above. Under certain conditions, however, a low power mode controller will cause the switching regulator to enter low power modes wherein switching in either or both of the PFC and PWM stages is disabled. When switching is disabled in a stage, the duty cycle of the corresponding switch falls to zero. The circuit can be configured to operate in one of four modes with both, neither or either one of the switches enabled.

When switching in both stages is enabled, as in the normal mode, switching in the PWM stage is then disabled in response to the error signal falling below a first error threshold. The error signal tends fall when the load draws a relatively low level of current. If the error voltage rises above the first error threshold, switching in the PWM stage is again enabled.

When switching in the PFC stage is enabled and switching in the PWM stage is disabled, as in a first low power mode, switching in the PFC stage is then disabled in response to the feedback voltage rising above a first feedback threshold. The feedback voltage tends to rise when switching in the PWM stage is disabled. If the feedback voltage falls below a second feedback threshold, lower than the first feedback threshold, switching in the PFC stage will again be enabled.

When switching in both stages is disabled, as in a second low power mode, switching in the PWM stage is then enabled in response to the error voltage rising above a second error threshold, higher than the first error threshold. The error voltage tends to rise when switching in the PWM stage is disabled. If the error voltage falls below the second error threshold, switching in the PWM stage will again be disabled.

When switching in the PFC stage is disabled and switching in the PWM stage is enabled, as in a third low power mode, switching in the PFC stage is enabled in response to the feedback voltage falling below the second feedback threshold. The feedback voltage will tend to fall when switching in the PFC stage is disabled.

As a result of these low power modes, wherein switching in one or both of the PFC and PWM stages is disabled in response to a level of power consumption in the load, the combination PFC-PWM switching regulator is highly efficient.

DETAILED DESCRIPTION OF THE PREFERRED EMBODIMENT

FIG. 6 illustrates a combination PWM-PFC voltage regulator, including a low power mode controller 148 according to the present invention. An AC input voltage Vac is applied to input terminals of full-wave bridge rectifier 100. An output of the rectifier 100 is coupled to a PFC stage 101. A first output terminal of the rectifier 100 is coupled to a first terminal of an inductor L3 and to a first terminal of a resistor R8. A second terminal of the inductor L3 is coupled to a drain of an NMOS transistor Q1 and to an anode of a diode D3. A cathode of the diode D3 is coupled to a first terminal of a capacitor C3, to a first terminal of a resistor R3, to a drain of an NMOS transistor Q2 and to a cathode of a diode D4. A second terminal of the resistor R3 is coupled to a first terminal of a resistor R4, to an inverting input of an amplifier 102, to a non-inverting input of a comparator 104 and to a non-inverting input of a comparator 106. A second terminal of the resistor R4, a second terminal of the capacitor C3 and a drain of the transistor Q1 are coupled to a first ground node.

An non-inverting input of the amplifier 102 is coupled to a reference voltage of 2.5 volts. An output of the amplifier 102 is coupled to a first input of a multiplier 108, to a first terminal of a switch SW3, to a first terminal of a capacitor C4 and to a first terminal of a capacitor C5. A second terminal of the resistor R8 is coupled to a second input of multiplier 108. A second terminal of the capacitor C5 is coupled to a first terminal of a resistor R7. A second terminal of the resistor R7, a second terminal of the capacitor C4 and a second terminal of the switch SW3 are coupled to the first ground node. A output of the multiplier 108 is coupled to a first terminal of a resistor R6. A second terminal of the resistor R6 is coupled to an inverting input of a amplifier 110, to a second output terminal of the rectifier 100, and to a first terminal of a resistor R5. A second terminal of the resistor R5 is coupled to the first ground node.

A non-inverting input of the amplifier 110 is coupled to a first terminal of a resistor R9. A second terminal of the resistor R9 is coupled to the first ground node. An output of the amplifier 110 is coupled to a first terminal of a capacitor C7, to a first terminal of a capacitor C6 and to a non-inverting input of a comparator 112. A second terminal of the capacitor C7 is coupled to a first terminal of a resistor R10. A second terminal of the resistor R10 and a second terminal of the capacitor C6 are coupled to the first ground node. An inverting input of the comparator 112 is coupled to receive a ramp signal from an oscillator 114. An output of the comparator 112 is coupled to an inverted set input S of a flip-flop 116.

A clock output of the oscillator 114 is coupled to an inverted reset input R of the flip-flop 116. A Q output of the flip-flop 116 is coupled to an input of an inverter 118. An output of the inverter 118 is coupled to a first input of a logical AND gate 119. An output of the logical AND gate 119 is coupled to a gate of the transistor Q1. Together, the inductor L3, the diode D3, the capacitor C3, the transistor Q1 and the logical AND gate 119 form the PFC stage 101 of the voltage regulator illustrated in FIG. 6. The PFC stage 101 illustrated in FIG. 6 is a boost converter, though it will be apparent that the PFC stage 101 can be another type of converter. Switching in the PFC stage 101 is controlled by a PFC controller 120.

A source of the transistor Q2 is coupled to a first terminal of a primary winding of a transformer T1, to a first terminal of a level shift circuit 122 and to a cathode of a diode D5. A second terminal of the level shift circuit 122 is coupled to a gate of the transistor Q2. An anode of the diode D4 is coupled to a second terminal of the primary winding of the transformer T2 and to a drain of an NMOS transistor Q3. A source of the transistor Q3 is coupled to a first terminal of a resistor R11 and to a first terminal of a resistor R12. A second terminal of the resistor R11 is coupled to a first terminal of a capacitor C8, to a first terminal of a 1.25 volt level shift circuit 124 and to a first terminal of a switch SW5. A second terminal of the capacitor C8, a second terminal of the resistor R12, an anode of the diode D5 and a second terminal of the switch SW5 are coupled to the first ground node.

A second terminal of the level shift circuit 124 is coupled to an inverting input of a comparator 126. An output of the comparator 126 is coupled to a first input of a logical AND gate 128. An output of the logical AND gate 128 is coupled to an inverting set input S of a flip-flop 130. A Q output of the flip-flop 130 is coupled to an input of an inverter 132. An output of the inverter 132 is coupled to a first input of a logical AND gate 134. A second input of the logical AND gate 134 is coupled to a first output of a clock with duty-limit circuit 136 and to an inverting reset terminal R of the flip-flop 130. A second output of the clock with duty limit circuit 136 is coupled to control the switch SW5. An output of the logical AND gate 134 is coupled to a gate of the transistor Q3 and to a third terminal of the level shift circuit 122.

A first terminal of a secondary winding of the transformer T1 is coupled to an anode of a diode D6. A cathode of the diode D6 is coupled to a cathode of a diode D7 and to a first terminal of an inductor L4. A second terminal of the inductor L4 is coupled to a first terminal of a capacitor C9, to a first terminal of a capacitor C10, to a first terminal of a resistor R13, to a first terminal of a resistor R14 and to an output node Vout3. A second terminal of the resistor R13 is coupled to a first terminal of a resistor R15 and to a first terminal of a capacitor C11. A second terminal of the resistor R15 is coupled to an anode of a light emitting diode D8. Light from the diode D8 is coupled to control a photo-responsive transistor Q4.

A cathode of the light emitting diode D8 is coupled to a first terminal of a resistor R16 and to a cathode of a Zener diode D9. A second terminal of the resistor R16 is coupled to a first terminal of a capacitor C12. A second terminal of the capacitor C12 is coupled to a second terminal of the resistor R14, to a first terminal of a resistor R17 and to a control terminal of the Zener diode D9. A second terminal of the secondary winding of the transformer T2, an anode of the diode D7, a second terminal of the capacitor C9, a second terminal of the capacitor C10, a second terminal of the capacitor C11, an anode of the Zener diode D9, a second terminal of the resistor R17 and a first terminal of a capacitor C13 are coupled to a second ground node. A second terminal of the capacitor C13 is coupled to the first ground node.

A reference voltage Vref3 is coupled to a first terminal of a resistor R20. A second terminal of the resistor R20 is coupled to a collector of the transistor Q4, to a non-inverting input of the comparator 126 and to an inverting input of a comparator 140. An emitter of the transistor Q4 is coupled to a first terminal of a resistor R19. A second terminal of the resistor R19 is coupled to the first ground node. Together, the transformer T1, the transistors Q2 and Q3, the inductor L4, the diode D7, and the capacitors C9 and C10 form a PWM stage 127 of the voltage regulator illustrated in FIG. 6. The PWM stage 127 illustrated in FIG. 6 is a buck converter, though it will be apparent that the PWM stage 127 can be another type of converter. Switching in the PWM stage 127 is controlled by a PWM controller 138. It will be apparent that the capacitors C9 and C10 can be replaced by a single capacitor and that the transistors Q2 and Q3 can be replaced by a single transistor with appropriate modifications.

A non-inverting input of the comparator 140 is coupled to a first terminal of a switch SW4. A second terminal of the switch is selectively coupled to a reference voltage of 1.58 volts or to a reference voltage of 1.3 volts according to a voltage applied to a control terminal PFCON of the switch SW4. An output Y3 of the comparator 140 is coupled to an input of an inverter 142 and to a first input of a logical NAND gate 144. An output PWMON of the inverter 142 is coupled to a second input of the logical AND gate 128. An inverting input of the comparator 104 is coupled to receive a reference voltage of 2.5 volts. An output Y2 of the comparator 104 is coupled to a second input of the logical NAND gate 144. An output Y4 of the logical NAND gate 144 is coupled to an inverted reset input R of a flip-flop 146.

An inverting input of the comparator 106 is coupled to receive a reference voltage of 2.25 volts. An output Y1 of the comparator 106 is coupled to an inverted set input S of the flip-flop 146. A Q output PFCON of the flip-flop 146 is coupled to the control terminal of the switch SW4. A $\overline{Q}$ output $\overline{\text{PFCON}}$ of the flip-flop 146 is coupled to a control terminal of the switch SW3. The low power mode controller 148 selectively disables switching in the PFC stage by controlling the AND gate 119 and the switch SW3 and selectively disables switching the PWM stage ("pulse-skipping") by controlling the voltage applied to the second input of the logical AND gate 128.

The switch SW3 shorts the output of the error amplifier 102 to ground when switching in the PFC stage is disabled. When switching in the PFC stage is re-enabled, the switch SW3 opens and output of the error amplifier 102 rises slowly from ground potential. This effectively provides a soft-start function for the PFC stage by gradually increasing the duty cycle of the transistor Q1.

A load can be coupled to receive the output voltage Vout3. The load can be any type of load which requires a regulated supply voltage. As will be apparent, however, the present invention is most advantageously utilized when the power requirements of the load vary over time. For example, a load having multiple operating modes, wherein different operating modes have different power requirements, can be efficiently powered by a voltage converter according to the present invention.

When the transistor Q1 is active (turned on), current from the rectifier 100 flows in the inductor L3, charging the inductor L3 with energy from the supply voltage source Vac. When the transistor Q1 is off, energy stored in the inductor L3 charges the capacitor C3. A duty cycle of the transistor switch Q1 controls a level of voltage formed across the capacitor C3. The voltage across C3 is monitored by forming a voltage VFB that is representative of the voltage across C3. The voltage VFB is formed by a resistive divider comprising the resistors R3 and R4. The PFC controller 120 controls a duty cycle of the transistor switch Q1 in a feedback loop to regulate the voltage across the capacitor C3 at a predetermined level.

In addition to performing this voltage regulation function, the PFC controller 120 ensures that switching of the transistor Q1 is performed at appropriate times so that the input current through the inductor L3 is maintained in phase with the supply voltage source Vac. Thus, the PFC controller 120 performs a power factor correction function. To accomplish this, the input voltage and the input current are monitored. The input voltage is monitored by applying a voltage representative of the input voltage to the second input of the multiplier 108 through the resistor R8. The input current is monitored by applying a voltage representative of the input current to the inverting input of the amplifier 110. This signal is formed by the resistor R5 and the resistor R6. The PFC controller 120 appropriately combines these signals in a current control loop for controlling the transistor Q1.

The voltage formed across the capacitor C3 is an intermediate voltage which is both the output voltage of the PFC stage and an input voltage for the PWM stage. Preferably, the intermediate voltage is maintained by the PFC controller 120 between approximately 340 and 380 volts DC.

The PWM controller 138 controls a duty cycle of the transistor switches Q2 and Q3 for regulating the voltage Vout3 across the capacitors C9 and C10 at a predetermined level. Preferably, the transistors Q2 and Q3 are controlled such that they are either simultaneously conducting or not conducting. When the transistors Q2 and Q3 are both active, energy stored in the capacitor C3 charges the primary winding of the transformer T1. When the transistors Q2 and Q3 are off, energy stored in the primary winding of the transformer T1 induces current in the secondary winding of the transformer T1 which charges the inductor L4 with energy. Energy from the inductor L4 charges the capacitors C9 and C10, thus, forming the output voltage Vout3. To regulate the output voltage Vout3, the PWM controller 138 monitors the output voltage Vout3 and, in response, modulates the duty cycle of the transistor switches Q2 and Q3 in a feedback loop.

The output voltage Vout3 is monitored by forming a current representative of the output voltage Vout3 through the light emitting diode D8. The light emitting diode D8 induces a current in the photo-responsive transistor Q4 that is representative of the output voltage Vout3. This current is drawn from the reference voltage Vref3, through the resistor R20 and causes the voltage at the collector of the transistor Q4 to drop. The voltage Vref3 is a constant voltage level. Therefore, the voltage formed at the collector of the transistor Q4 is an error voltage DCVEAO that is representative of a difference between the output voltage Vout3 and the desired output voltage. It will be apparent that the error voltage DCVEAO could be formed by an amplifier having a non-inverting input coupled to receive a reference voltage representative of the desired output voltage and an inverting input coupled to receive a voltage representative of the output voltage Vout3.

A periodic ramp signal PWMRAMP is formed by the resistors R11, R12 and the capacitor C8. The error voltage DCVEAO is compared to the periodic ramp signal PWM-RAMP by the comparator 126 for appropriately modulating the duty cycle of the transistor switches Q2 and Q3. Thus, the output voltage Vout3 is regulated in a feedback loop. Preferably, the output voltage Vout3 is regulated at approximately 12 volts DC, though the voltage Vout3 can be regulated at another level.

Under normal conditions, such as when the load coupled to receive the output voltage Vout3 draws a relatively high level of current from the PWM stage, the PFC and PWM stages operate as described above. Under certain conditions, however, the low power mode controller 148 will disable switching in either or both of the PFC and PWM stages. When switching is disabled in the PFC stage, the duty cycle for the switch Q1 falls to zero. When switching is disabled in the PWM stage, the duty cycle for the switches Q2 and Q3 falls to zero.

The low power mode controller 148 monitors the intermediate voltage formed across the capacitor C3. This is accomplished by coupling the voltage VFB to the non-inverting input of each of the comparators 104 and 106. In addition, the low power mode controller 148 monitors the output voltage Vout3 formed across the capacitors C9 and C10. This is accomplished by coupling the error voltage DCVEAO to the inverting input of the comparator 140.

Figure 6A:
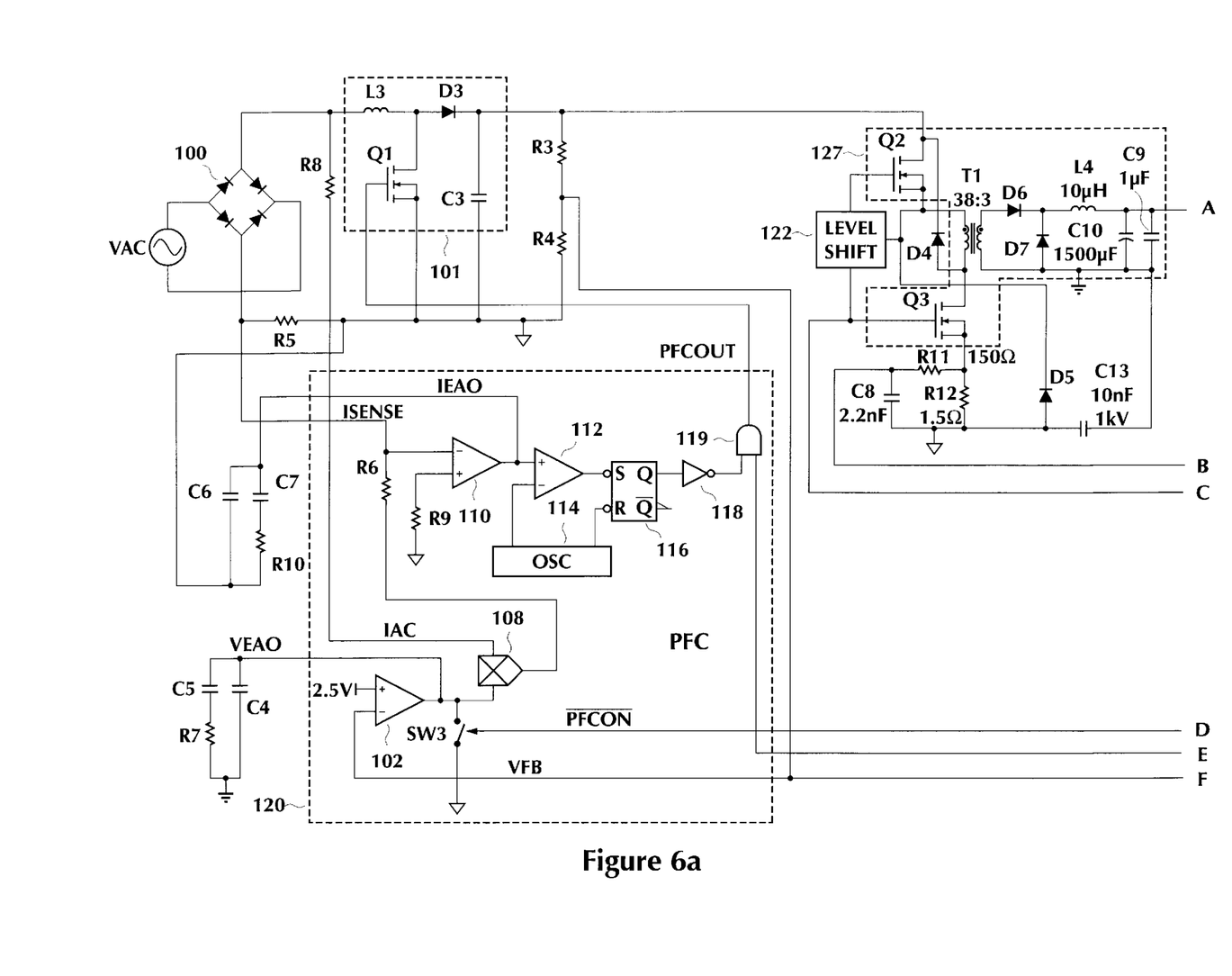
FIG. 6 illustrates a combination PWM-PFC voltage regulator, including a low power mode controller 148 according to the present invention.
Figure 6B:
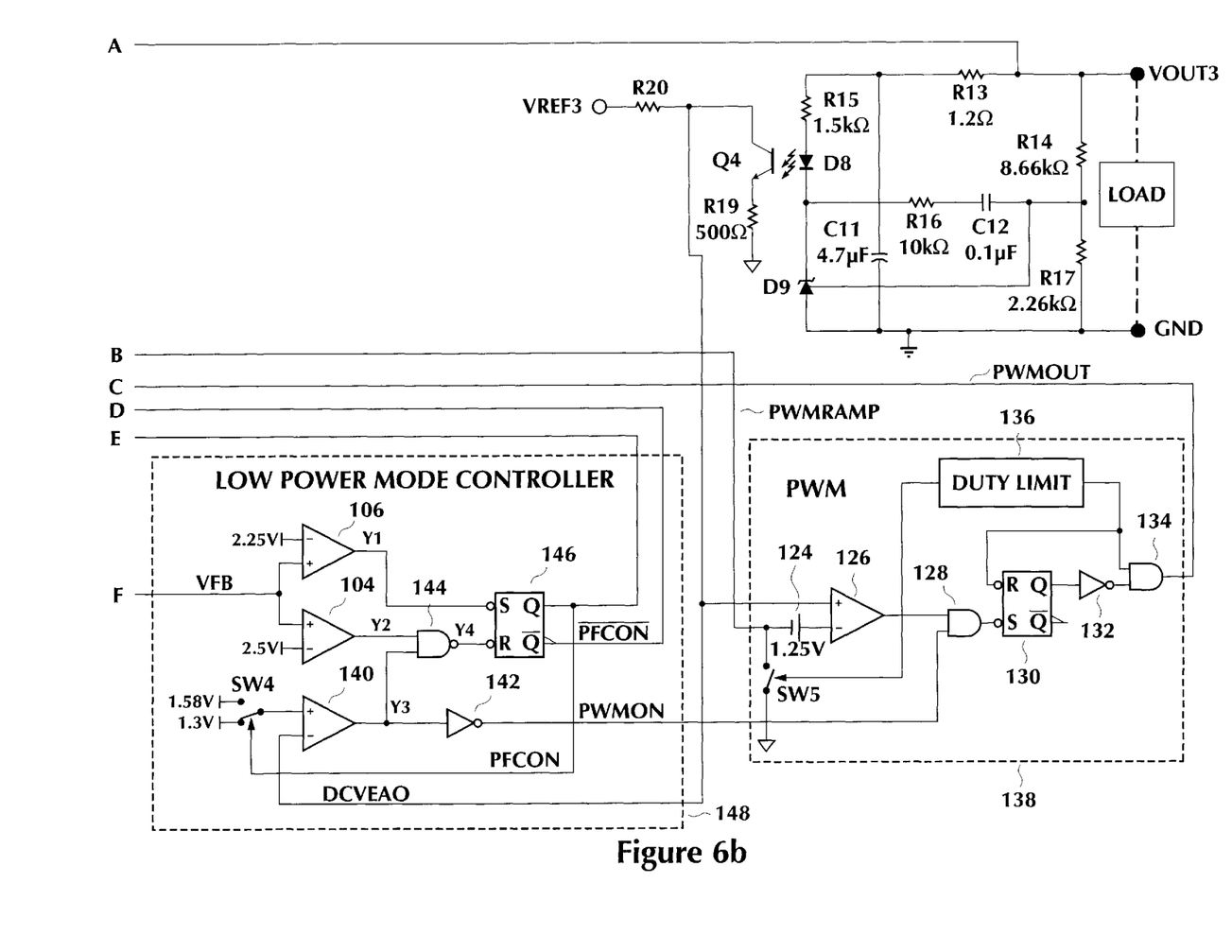
Figure 7:
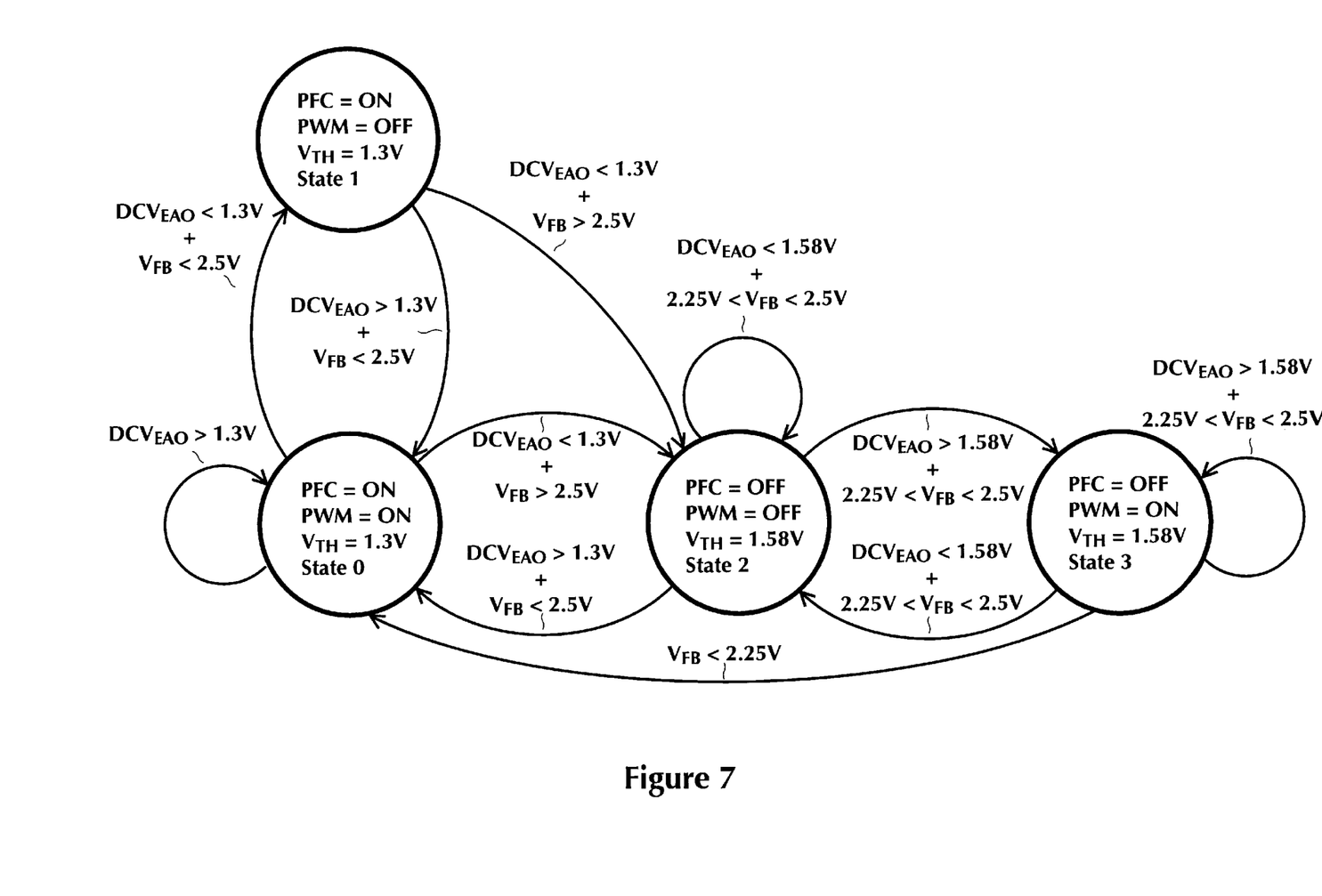
FIG. 7 illustrates a state diagram for the low power mode controller 148 according to the present invention.

FIG. 7 illustrates a state diagram for the low power mode controller 148. The following discussion relates operation of the combination PFC-PWM voltage regulator, including the low power mode controller 148, illustrated in FIG. 6, to the state diagram illustrated in FIG. 7. Upon start up of the PFC-PWM voltage regulator, the intermediate voltage across the capacitor C3 is low. Therefore, the feedback voltage VFB is below 2.25 volts. As such, the output Y1 of the comparator 106 is a logical low voltage. This places the flip-flop 146 in a set condition. Thus, the signal PFCON is a logical high voltage, the signal $\overline{\text{PFCON}}$ is a logical low voltage, the AND gate 119 is enabled to pass the output signal from the flip-flop 116 to the transistor Q1 and the switch SW3 is open. In this condition, the PFC stage operates normally to regulate the intermediate voltage across the capacitor C3 by appropriately controlling a duty cycle for the switch Q1. Because the intermediate voltage is initially low, the PFC controller 120 initially operates the switch Q1 at a maximum duty cycle, though the duty cycle will be reduced as the intermediate voltage across the capacitor C3 rises. Preferably, when the PFC stage is actively switching, the intermediate voltage is regulated to 380 volts, corresponding to a feedback voltage VFB of 2.5 volts. In addition, because the flip-flop 146 is in a set condition, the level of PFCON is a logical high voltage and, thus, the switch SW4 is conditioned to couple the 1.3 volt reference level to the noninverting input of the comparator 140.

Also upon start up, the output voltage Vout3 is initially low. Therefore, the error voltage DCVEAO is near the level of the reference voltage Vref3. As such, the error voltage DCVEAO is above the 1.3 volt reference level and the output Y3 of the comparator 140 is a logical low voltage. Therefore, the level of PWMON is a logical high voltage. When the level of PWMON is logical high voltage, the PWM stage operates normally to regulate the output voltage Vout3 by appropriately controlling a duty cycle for the switches Q2 and Q3. Because the output voltage Vout3 is initially low, the PWM controller 138 initially operates the switches Q2 and Q3 at a maximum duty cycle, though the duty cycle will be reduced as the output voltage Vout3 rises. Also, when the output Y3 of the comparator 140 is a logical low voltage, the output Y4 of the NAND gate 144 is a logical high voltage.

When VFB is equal to 2.25 volts, this preferably corresponds to an intermediate voltage level across the capacitor C3 of 340 volts. When VFB is equal to 2.5 volts, this preferably corresponds to an intermediate voltage level across the capacitor C3 of 380 volts. As the intermediate voltage rises to a steady state value of preferably 380 volts, the voltage VFB will rise above 2.25 volts. As a result, the output Y1 of the comparator 106 will change from a logical low voltage to a logical high voltage. This change, by itself, will not affect the state of the flip-flop 146, but will enable the inverted reset input R to affect the state of the flip-flop 146 should the output Y4 of the NAND gate 144 change to a logical low voltage.

If the voltage VFB rises above 2.5 volts, the output Y2 will change from a logical low voltage to a logical high voltage. This change, however, will not affect the state of the flip-flop 146 unless the output Y3 of the comparator 140 also changes. Note that when the PFC stage is actively switching (enabled), the intermediate voltage is regulated to preferably 380 volts. Due to ripple in the intermediate voltage, the actual voltage will tend to repeatedly rise above, and fall below, 380 volts. Thus, the feedback voltage VFB will tend to rise above, and fall below, 2.5 volts. Accordingly, when the PFC stage is enabled, the logic value of Y2 will tend to transition repeatedly between zero and one.

When switching in both the PFC stage and the PWM stage is enabled, such that the duty cycles for the switches Q1, Q2 and Q3 are greater than zero, as described above, this corresponds to State 0 in FIG. 7. The enabled condition of the switch Q1 is denoted in FIG. 7 by "PFC=ON," whereas, the enabled condition of the switches Q2 and Q3 is denoted in FIG. 7 by "PWM=ON." Because the signal PFCON is logical high voltage, the switch SW4 couples the 1.3 volt threshold voltage to the non-inverting input of comparator 140. These conditions exist when the load draws a relatively high current resulting in the error voltage DCVEAO remaining above the reference level of 1.3 volts.

If the load begins to draw a lower level of current, however, this will tend to cause the error voltage DCVEAO to fall. When the error voltage falls below 1.3 volts, the output of the comparator 140 will change from a logical low voltage to a logical high voltage. Due to the inverter 142, the signal PWMON will change from a logical high voltage to a logical low voltage. Therefore, switching in the PWM stage will be disabled (PWM=OFF), conserving power, while switching in the PFC stage remains enabled (PFC=ON). This condition corresponds to State 1 in FIG. 7. If the error voltage DCVEAO then rises again to above 1.3 volts, switching will resume in the PWM stage (PWM=ON). Therefore, in such case, the low power mode controller 148 returns to State 0.

It is expected that the error voltage will typically rise above, and fall below, the threshold of 1.3 volts, thus resulting in the low power mode controller 148 repeatedly transitioning back and forth between State 0 and State 1. Typically, several clock cycles will be skipped in State 1 before returning to State 0, while only a single clock cycle (or more) may be required in State 0 to reduce the error voltage below the threshold of 1.3 volts. This transitioning between States 0 and 1 can be referred to as a first "pulse skipping" mode. Ripple in the output voltage Vout3 will generally coincide with transitions between States 0 and 1. Thus, although the output voltage Vout3 will tend to include some ripple, this increase in ripple is a trade-off for increased efficiency of the power converter.

The intermediate voltage will tend to rise during periods of the first pulse-skipping mode (transitioning between States 0 and 1). This is because less current is drawn by the PWM stage from the capacitor C3. If the intermediate voltage across the capacitor C3 rises above 380 volts (typically, due to ripple in the intermediate voltage) such that the feedback voltage VFB rises above 2.5 volts, the output Y2 of the comparator 104 will change from a logical low voltage to a logical high voltage.

In State 0, DCVEAO is above 1.3 volts. If the feedback voltage VFB is above 2.5 volts and, then, DCVEAO falls below 1.3 volts, the output of the NAND gate 144 will change from a logical high voltage to a logical low voltage. Alternately, in State 1, where DCVEAO is below 1.3 volts, if the feedback voltage VFB then rises above 2.5 volts, the output of the NAND gate 144 will change from a logical high voltage to a logical low voltage.

As a result of the output of the NAND gate 144 changing to a logical low voltage, the flip-flop 146 will be reset. The signal $\overline{PFCON}$ will, therefore, change from a logical low voltage to a logical high voltage which disables switching in the PFC stage, via the switch SW3 and logical AND gate 119, such that switching in both stages is disabled (PFC=OFF; PWM=OFF). This condition corresponds to State 2 in FIG. 7. Thus, the power converter can transition from State 0 to State 2 or from State 1 to State 2.

In State 2, little or no power is drawn from the supply Vac because switching in both stages is disabled. In addition, because the signal PFCON changes from a logical high voltage to a logical low voltage, this conditions the switch SW4 to couple the 1.58 volt reference level to the non-inverting input of the comparator 140.

If both the PFC and PWM stages are disabled, as in State 2, and the error voltage DCVEAO rises above 1.58 volts, the output Y3 of the comparator 140 will change from a logical high voltage to a logical low voltage. For example, this will tend to occur as a result of current drawn by the load. In such case, the signal PWMON will change from a logical low voltage to a logical high voltage and switching in the PWM stage will resume (PWM=ON). This condition corresponds to State 3 in FIG. 7. If the error voltage DCVEAO falls below 1.58 volts, switching the PWM stage will again be disabled (PWM=OFF). Therefore, in such case, the low power mode controller 148 returns to State 2.

It is expected that the error voltage DCVEAO will typically rise above, and fall below, the threshold of 1.58 volts, thus resulting in the low power mode controller 148 repeatedly transitioning back and forth between State 2 and State 3. Typically several clock cycles will be skipped in State 2 before returning to State 3, while only a single clock cycle (or more) in State 3 may be required to reduce the error voltage below the threshold of 1.58 volts. This transitioning between States 2 and 3 can be referred to as a second "pulse skipping" mode. Ripple in the output voltage Vout3 will generally coincide with the transitions between States 2 and 3. Thus, although the output voltage Vout3 will tend to include some ripple, this increase in ripple is a trade-off for increased efficiency of the power converter.

The intermediate voltage will tend to fall during periods of the second pulse-skipping mode (transitioning between States 2 and 3). This is because switching is disabled in the PFC stage (PFC=OFF) in both State 2 and State 3. If the intermediate voltage across the capacitor C3 falls below 340 volts such that the feedback voltage VFB falls below 2.25 volts, the output Y1 of the comparator 104 will change from a logical high voltage to a logical low voltage.

In State 2, DCVEAO is below 1.58 volts, however, it is not expected that DCVEAO will be below 1.3 volts. This is because the second pulse-skipping mode (transitioning between States 2 and 3), results in DCVEAO remaining near 1.58 volts. Therefore, in State 2, if the feedback voltage VFB falls below 2.25 volts, the output of the comparator 106 will change from a logical high voltage to a logical low voltage. This will set the flip-flop 146 such that PFCON changes from a logical low voltage to logical high voltage. This enables switching in the PFC stage and couples the threshold voltage of 1.3 volts to the non-inverting input of the comparator 140. Accordingly, because DCVEAO is above 1.3 volts, Y3 will change from a logical high voltage to a logical low voltage. This enables switching in the PWM stage. Thus, switching is enabled in both stages, as in State 0. This transition from State 2 to State 0 is illustrated in FIG. 7.

Alternately, in State 3, where DCVEAO is above 1.58 volts, if the feedback voltage VFB then falls below 2.25 volts, the output of the comparator 106 will change from a logical high voltage to a logical low voltage. This will set the flip-flop 146 such that PFCON changes from a logical low voltage to logical high voltage. This enables switching in the PFC stage and couples the threshold voltage of 1.3 volts to the non-inverting input of the comparator 140. Accordingly, because DCVEAO is above 1.58 volts, Y3 will remain a logical low voltage and switching in the PWM stage will remain enabled. Thus, switching is enabled in both stages, as in State 0. This transition from State 3 to State 0 is illustrated in FIG. 7. Transitions from State 0 are discussed above.

FIG. 8 illustrates a schematic diagram of a PFC controller, a PWM controller and a low power mode controller incorporated into an integrated circuit 200 according to the present invention. FIG. 8 also illustrates PFC and PWM stages external to the integrated circuit 200.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. In addition, it will be apparent that a transistor of one type, such as NMOS, PMOS, bipolar pnp or bipolar npn can be interchanged with a transistor of another type, and in some cases interchanged with a diode, with appropriate modifications of the remaining circuitry, and so forth. Further, it will be apparent that power converter stage or a circuit for controlling a power converter stage having a circuit topology that differs from the topologies of the PFC stage, the PFC controller, the PWM stage, the PWM controller or the low power mode controller can be utilized while achieving the advantages of the present invention.

What is claimed is:

1. A switching regulator comprising:
   a. a first stage having a first switch the first stage for receiving an input voltage and for forming an intermediate voltage, wherein the intermediate voltage is regulated according to a duty cycle of the first switch;
   b. a second stage having a second switch, the second stage coupled to receive the intermediate voltage for forming an output voltage, wherein the output voltage is regulated according to a duty cycle of the second switch; and
   c. a circuit for separately and selectively disabling switching of the first switch and the second switch according to power requirements of a load coupled to receive the output voltage, wherein the circuit for selectively disabling is coupled to the first stage and to the second stage.

2. The switching regulator according to claim 1 wherein the switching regulator operates in an active one of four modes, selected according to power requirements of the load, wherein in a normal mode, switching of both the first switch and the second switch is enabled; in a first low power mode, switching of the first switch is enabled and the second switch is disabled; in a second low power mode, both the first switch and the second switch are disabled; and, in a third low power mode, the first switch is disabled and switching of the second switch is enabled.

3. The switching regulator according to claim 1 wherein the first stage is power factor correction stage.

4. The switching regulator according to claim 1 wherein the second stage is a pulse-width modulating buck converter stage.

5. The switching regulator according to claim 1 wherein upon enabling switching of the first switch, the duty cycle of the first switch is gradually increased according to a soft-start function.

6. The switching regulator according to claim 1 wherein the duty cycle of the first switch is controlled according to a level of a feedback signal, wherein the feedback signal is representative of a level of the intermediate voltage.

7. The switching regulator according to claim 6 wherein the duty cycle of the second switch is controlled according to a level of an error signal, wherein the error signal is representative of a difference between the output voltage and a desired output voltage.

8. The switching regulator according to claim 7 wherein the circuit for selectively disabling switching disables the second switch when the error signal falls below a first error threshold, thereby the switching regulator enters the first low power mode.

9. The switching regulator according to claim 8 wherein when the switching regulator is in the first low power mode, the circuit for selectively disabling enables switching of the second switch when the error signal exceeds the first error threshold, thereby the switching regulator enters the normal mode.

10. The switching regulator according to claim 8 wherein when the switching regulator is in the first low power mode, the circuit for selectively disabling disables the first switch when the feedback signal exceeds a first feedback threshold, thereby the switching regulator enters the second low power mode.

11. The switching regulator according to claim 10 wherein when the switching regulator is in the second low power mode, the circuit for selectively disabling enables switching of the first switch when the feedback signal falls below a second feedback threshold, thereby the switching regulator returns to the first low power mode, and wherein the second feedback threshold is lower than the first feedback threshold.

12. The switching regulator according to claim 10 wherein when the switching regulator is in the second low power mode, the circuit for selectively disabling enables switching of the second switch when the error signal exceeds a second error threshold, thereby the switching regulator enters a third low power mode, and wherein the second error threshold is higher than the first error threshold.

13. The switching regulator according to claim 12 wherein when the switching regulator is in the third low power mode, the circuit for selectively disabling enables the first switch when the feedback signal falls below a second feedback threshold, thereby the switching regulator returns a normal mode wherein switching of the first switch and the second switch is enabled, and wherein the second feedback threshold is lower than the first feedback threshold.

14. The switching regulator according to claim 12 wherein when the switching regulator is in the third low power mode, the circuit for selectively disabling disables the second switch when the error signal falls below the second error threshold, thereby the switching regulator enters the second low power mode.

15. The switching regulator according to claim 6 wherein the circuit for selectively disabling switching comprises:
   a. a first comparator having a first input, a second input and an output, wherein the first input of the first comparator is coupled to receive the feedback voltage and the second input of the first comparator is coupled to receive a first feedback threshold voltage;
   b. a second comparator having a first input, a second input and an output, wherein the first input of the second comparator is coupled to receive the feedback voltage and wherein the second input of the second comparator is coupled to receive a second feedback threshold voltage;
   c. a third comparator having a first input, a second input and an output, wherein the first input of the third comparator is coupled to receive the error signal and the second input is coupled to a receive an error threshold voltage and wherein the output of the third comparator is coupled to selectively disable the second switch; and d. a flop-flop having a first input for placing the flip-flop in a first condition and a second input for placing the flip-flop in a second condition, wherein the first input is coupled to the output of the second comparator and the second input is coupled to receive a logical combination of the output of the first comparator and the output of the third comparator, wherein the first switch is selectively disabled depending upon whether the flip-flop is in the first condition or in the second condition.

16. The switching regulator according to claim 15 wherein the first feedback threshold is higher than the second feedback threshold.

17. The switching regulator according to claim 15 wherein a level of the error threshold voltage depends upon whether the flip-flop is in the first condition or in the second condition.

18. A method of conserving power consumed by a switching regulator wherein the switching regulator includes a first stage having a first switch and a second stage having a second switch and wherein the first stage supplies an intermediate signal to the stage and wherein second stage forms an output signal for supplying power to a load, the method comprising:

a. operating the switching regulator in a normal mode wherein a duty cycle of the first switch is adjusted according to a level of the intermediate signal and wherein a duty cycle of the second switch is adjusted according to difference between the output signal and a desired output signal;

b. operating the switching regulator in a first low power mode when the difference between the output signal and the desired output signal is lower than a first error threshold wherein the duty cycle of the first switch is adjusted according to a level of the intermediate output signal and the duty cycle of the second switch is zero; and c. operating the switching regulator in a second low power mode when the intermediate output signal is higher than a first feedback threshold wherein the duty cycle of the first switch is zero and wherein the duty cycle of the second switch is zero.

19. The method according to claim 18 further comprising a step of operating the switching regulator in the first low power mode after operating the switching regulator in the second low power mode upon the intermediate signal becoming lower than a second feedback threshold wherein the second feedback threshold is lower the first feedback threshold.

20. The method according to claim 19 wherein upon leaving the second low power mode, the duty cycle of the first switch is gradually increased according to a soft-start function.

21. The method according to claim 18 further comprising a step of operating the switching regulator in a third low power mode after operating the switching regulator in the second low power mode upon the difference between the output signal and the desired output signal becoming higher than a second error threshold wherein the duty cycle of the first switch is zero and the duty cycle of the second switch is adjusted according to the difference between the output signal and the desired output signal.

22. The method according to claim 21 further comprising a step of operating the switching regulator in the normal mode after operating the switching regulator in the third low power mode upon the intermediate signal becoming lower than the second feedback threshold wherein the second feedback threshold is lower the first feedback threshold.

23. The method according to claim 21 wherein the second error threshold is higher than the first error threshold.

24. The method according to claim 18 wherein the switching regulator operates in the first low power mode only after having been operated in the normal mode.

25. The method according to claim 24 wherein the switching regulator operates in the second low power mode only after having been operated in the first low power mode.

* * * * *

UNITED STATES PATENT AND TRADEMARK OFFICE
CERTIFICATE OF CORRECTION

PATENT NO. : 5,903,138

DATED : May 11, 1999

INVENTOR(S) : Jeffrey H. Hwang et al.

It is certified that error appears in the above-identified patent and that said Letters Patent is hereby correct as shown below:

In Column 2, on line 18, after "switch" and before "is", delete "SW" and insert --SW1--.

Figure 8A:
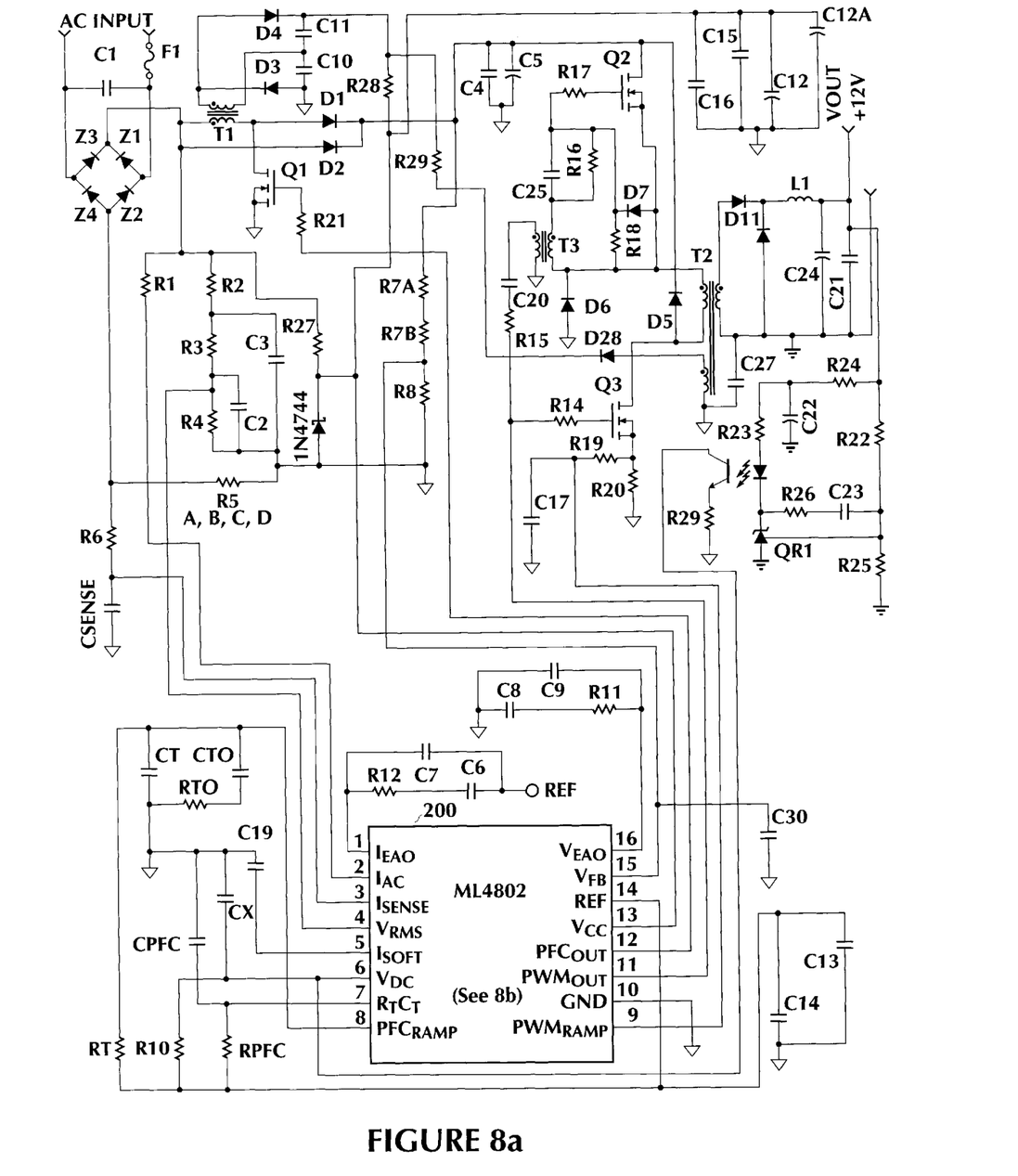
FIG. 8 illustrates a schematic diagram of a PFC controller, a PWM controller and a low power mode controller incorporated into an integrated circuit 200 according to the present invention and illustrates PFC and PWM stages external to the integrated circuit 200.
Figure 8B:
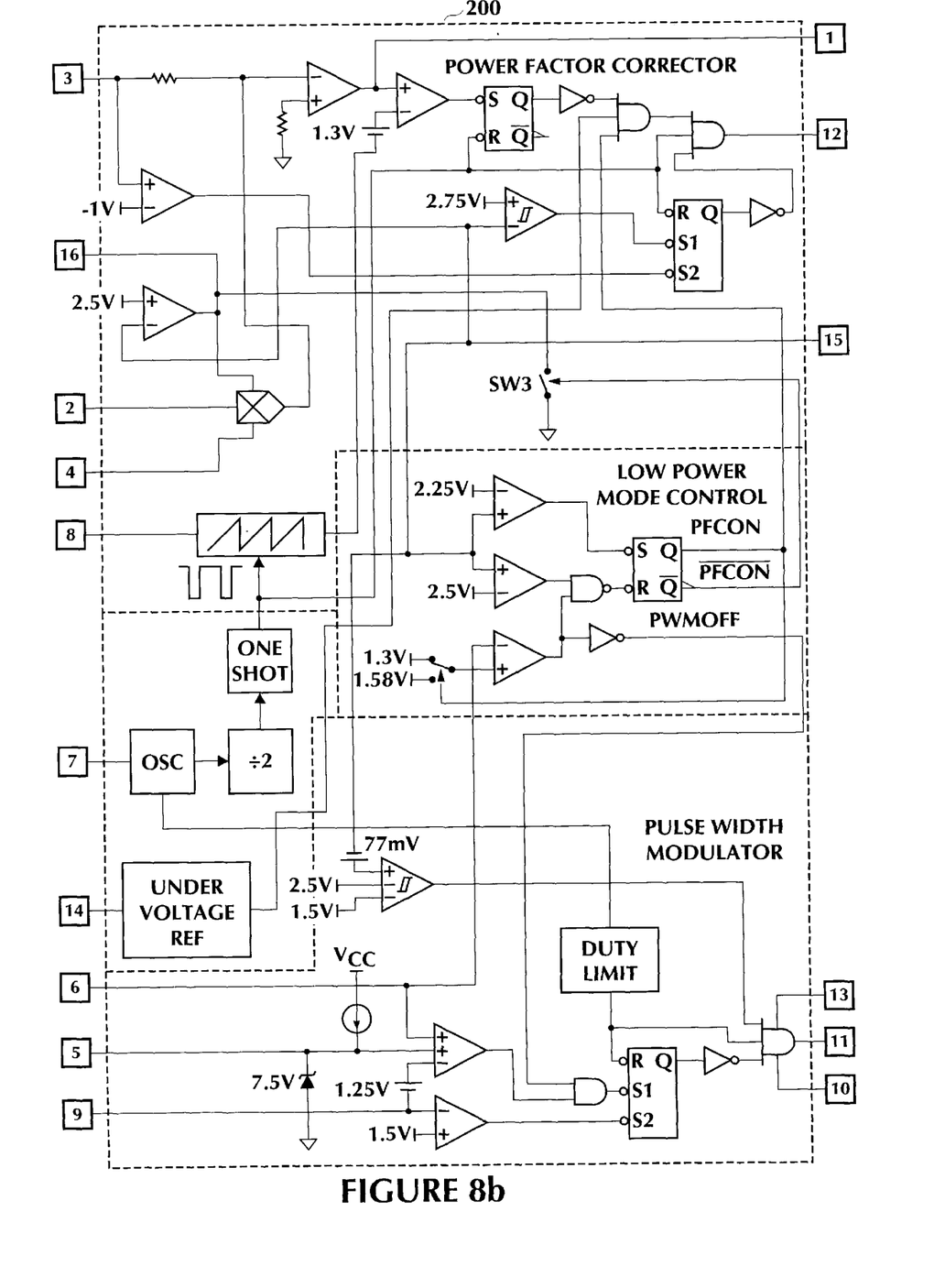

In Column 5, on line 40, before "a combination PWM-PFC...", delete "FIG. 6 illustrates" and insert --Figs. 6a and 6b illustrate--; on lines 45-50, delete the paragraph "Fig. 8 illustrates a schematic diagram of a PFC controller, a PWM controller and a low power mode controller incorporated into an integrated circuit 200 according to the present invention and illustrates PFC and PWM stages external to the integrated circuit 200." and insert the paragraphs:

-- Fig. 8a illustrates an integrated circuit 200 and PFC and PWM stages external to the integrated circuit 200 according to the present invention.
Fig. 8b illustrates a schematic diagram of a PFC controller, a PWM controller and a low power mode controller incorporated into the integrated circuit 200 of Fig. 8a according to the present invention.--;

and on line 54, before "a combination PWM-PFC...", delete "Fig. 6 illustrates" and insert --Figs. 6a and 6b illustrate--.

In Column 6, on line 44, after "...regulator illustrated in", delete "Fig. 6." and insert --Figs. 6a and 6b.--; and on line 45, after "...illustrated in", delete "Fig. 6" and insert --Fig. 6a--.

In Column 7, on line 49, after "...regulator illustrated in", delete "Fig. 6." and insert --Figs. 6a. and 6b--; on line 50, after "... illustrated in", delete "Fig. 6" and insert --Fig. 6a--; and on line 53, after "138" and before the period ".", insert --(Fig. 6b)--.

UNITED STATES PATENT AND TRADEMARK OFFICE
CERTIFICATE OF CORRECTION

PATENT NO.    : 5,903,138                                    Page 2 of 2

DATED         : May 11, 1999

INVENTOR(S)   : Jeffrey H. Hwang et al.

It is certified that error appears in the above-identified patent and that said Letters Patent is hereby correct as shown below:

In Column 9, on line 64, after "...illustrated in", delete "Fig. 6" and insert --Figs. 6a and 6b--.

In Column 12, beginning on line 65 and ending in Column 13, on line 2, delete the paragraph "Fig. 8 illustrates a schematic diagram of a PFC controller, a PWM controller and a low power mode controller incorporated into an integrated circuit 200 according to the present invention. Fig. 8 also illustrates PFC and PWM stages external to the integrated circuit 200."and insert the paragraph:

--    Fig. 8a illustrates an integrated circuit 200 and PFC and PWM stages external to the integrated circuit 200 according to the present invention. Fig. 8b illustrates a schematic diagram of a PFC controller, a PWM controller and a low power mode controller incorporated into the integrated circuit 200 of Fig. 8a according to the present invention.--.

Signed and Sealed this

Second Day of November, 1999

Q. TODD DICKINSON

*Attest:*

*Attesting Officer*    Acting Commissioner of Patents and Trademarks